United States Patent [19]

Vanore

[11] 4,152,005
[45] May 1, 1979

[54] TRICYCLE FOR HANDICAPPED INDIVIDUALS

[76] Inventor: Richard Vanore, 329 Northrop Rd., Brick Township, Essex County, N.J. 08723

[21] Appl. No.: 874,018

[22] Filed: Jan. 31, 1978

[51] Int. Cl.² .............................................. B62M 1/12
[52] U.S. Cl. .................................... 280/234; 280/240; 280/282
[58] Field of Search ........... 280/233, 234, 240, 242 R, 280/249, 250, 282

[56] References Cited

U.S. PATENT DOCUMENTS

| | | | |
|---|---|---|---|
| 2,533,728 | 12/1950 | Gedat et al. | 280/233 |
| 3,485,508 | 12/1969 | Hudnall | 280/234 |
| 3,910,599 | 10/1975 | Thomas | 280/234 |
| 3,921,744 | 11/1975 | Benoit et al. | 280/242 WC X |

Primary Examiner—David M. Mitchell
Assistant Examiner—Michael Mar
Attorney, Agent, or Firm—Charles F. Gunderson

[57] ABSTRACT

A tricycle having both front and rear wheel drives, for hand and foot motion respectively, includes a front wheel drive assembly that is adjustable with respect to the frame of the tricycle to position a hand crank in the optimum position for almost any user. A seat assembly is also adjustable with respect to the frame, and a rear wheel drive assembly is also adjustable with respect to the frame to make the tricycle adaptable to any handicapped child or individual, to give him the maximum use of his limbs; to exercise his limbs in the best therapeutic manner; and to allow for growth and changes and improvements in this muscular coordination.

3 Claims, 2 Drawing Figures

TRICYCLE FOR HANDICAPPED INDIVIDUALS

BACKGROUND OF THE INVENTION

Bicycles in general are very well known, and provide an exceptionally valuable mode of transportation. However, they require balance to maneuver and a certain amount of agility to keep upright and going on a straight course. For the very young—and very old—cyclists, and for people who have insufficient strength or balance to maneuver a bicycle, the tricycle provides a stabler and safer mode of transportation, while still retaining some of the advantages of a bicycle.

Most tricycles are designed for ordinary people who have reasonable use of all of their limbs, and reasonable balance for getting on and off of the tricycle, and for sitting on a conventional saddle that can be adjusted, to a limited degree, for driving the tricycle in a well known manner.

DESCRIPTION OF THE PRIOR ART

Almost all cycles are driven by the rear wheel, and by far the most common means of propulsion is foot pedals. There are only a few cycles that use hand cranks, but these are specially made and have nothing but hand cranks. A few bicycles were developed and may have been seen around the turn of the century—in the heyday of the bicycle—that used a combination of foot and hand power. However, all of these were directed towards getting more of the potential power out of any operator. Several forms of hand motion were proposed at that time to provide auxilliary power to the front wheels, or even to supplement the power to the rear wheel. However, these were all for bicycles, and were intended to increase the efficiency of an already-very-efficient form of transportation, and were for use only by an even-more agile and acrobatic operator.

None of these exotic forms of bicycle appears to be in use today, and, certainly, none of these teachings could be applied to a cycle for the use of handicapped children.

Among the few developments in tricycles for use of handicapped individuals is the "Front Wheel Drive Cycle" of Vittori; U.S. Pat. No. 3,848,891, issued Nov. 19, 1974. Vittori shows and teaches a hand-driven front-wheel-drive tricycle for use by paraplegic individuals, and, while this is certainly a noteworthy invention, it teaches only the use of hand power and front wheel drive. In addition, there is no teaching of adjustment, aside from the longitudinal position of the tiller bar, to accommodate different paraplegics or to accommodate the growth of an individual.

More important, there is no means seen in Vittori—nor is there any teaching of any means—for accommodating the feet and legs of certain types of handicapped children who may have limited use of their legs, or where there may be a need to exercise the legs to gradually develop them. This may be of very great importance in a therapeutic program towards the recovery of a handicapped individual, because at some time it may be advisable to exercise the legs even when they are not, of themselves, capable of doing any useful work.

It is therefore an object of this invention to provide a tricycle that has a crank mechanism for driving the front wheels by hand, and a pedal mechanism for driving the rear wheels by foot.

It is a further object of this invention to provide a tricycle that can be adjusted to accommodate the large majority of handicapped children at an early age, when exercise is essential, and also can be adjusted to accommodate their growth in size, as well as their improvement in muscular coordination and condition.

It is a further object of this invention to provide a tricycle that has a hand-crank front wheel drive, and an auxilliary, foot-pedal rear wheel drive, along with a completely adjustable frame for controlling the position of the driver; the distance between his body and the hand crank; and the distance between his body and the foot pedals.

SUMMARY OF THE INVENTION

A tricycle for handicapped individuals has a hand crank coupled through a chain drive linkage to the front wheel of the tricycle, and foot pedals coupled through a chain drive linkage to the rear wheels. A frame supports the front wheel and its chain drive linkage in a steerable manner; the rear wheels and their chain drive linkage; and a seat assembly. Adjustments are provided for the position of the seat with respect to the frame; the position of the hand crank with respect to the frame and the seat; and the position of the foot pedals with respect to the frame and the seat.

This tricycle is unique in its ability to be adjusted for almost any handicapped individual, and varied to accommodate his changes. It may also be adapted, at short notice, to another individual.

DESCRIPTION OF THE PREFERRED EMBODIMENT

Figure 1:
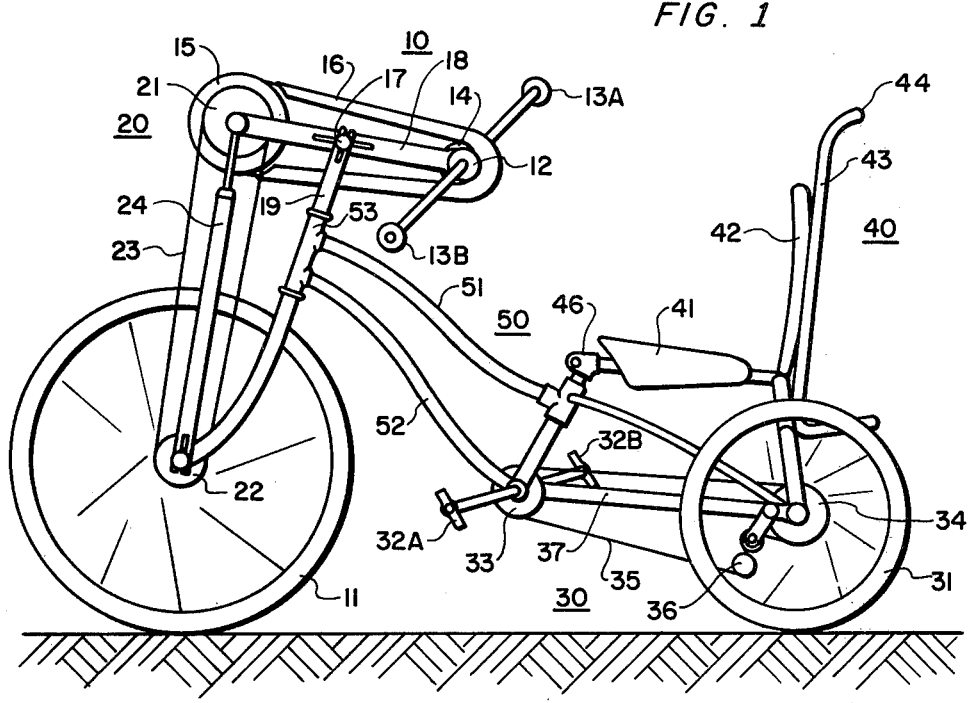
FIG. 1 shows a side view of one embodiment of this invention.

Referring now more particularly to FIG. 1, a side view of a tricycle is seen with the rear wheels in alignment for simplicity—and since their alignment and orientation is not a part of this invention. This tricycle has a frame 50; a front wheel drive mechanism having upper front wheel drive linkage or assembly 10 and a lower front wheel drive linkage or assembly 20; a rear wheel drive linkage or assembly 30; and a seat assembly 40 mounted on the frame 50.

The upper front wheel drive assembly 10 has a hand crank 12 with handles 13A and 13B turning a sprocket 14, which drives another sprocket 15 by means of a chain 16. The sprockets 14 and 15 are spaced and held in position by an upper front wheel drive linkage support 18 which is secured to an upper portion 19 of a front wheel fork by a fastener 17. The front wheel fork is otherwise conventional The lower front wheel drive linkage or assembly 20 has an upper sprocket 21, directly coupled to the sprocket 15, a lower sprocket 22 coupled to a front wheel 11, and coupled to the sprocket 21 by means of a chain 23. The sprockets are spaced and held in their relative positions by a lower front wheel drive linkage support or swing arm 24. The front wheel 11 is rotatably mounted at the lower end of the front wheel fork in the usual manner. The front wheel fork also steers the cycle.

The rear wheel drive linkage or assembly 30 has foot pedals 32A and 32B driving a sprocket 33 which is coupled to a sprocket 34 on rear wheels 31 by a chain 35. A gear-changing apparatus 36 may be provided. The sprockets 33 and 34 along with the pedals and rear wheels are spaced and held in the relative positions by a rear wheel drive linkage support 37 which, in FIG. 1 is part of the frame.

The seat assembly 40 has a seat or saddle 41, and a backrest 42 supported by a back brace or sissy bar 43 that may include a handle or handles 44. In FIG. 1, the back brace 43 is coupled to a seat brace 46, and to the frame in a well known manner.

The frame 50 couples all of these elements together in an operable manner, and includes typical frame members 51 and 52 that support and couple a housing or bushing 53, through which the front wheel fork and front wheel drive assembly pivots, to the seat assembly and the rear wheel drive assembly.

Figure 2:
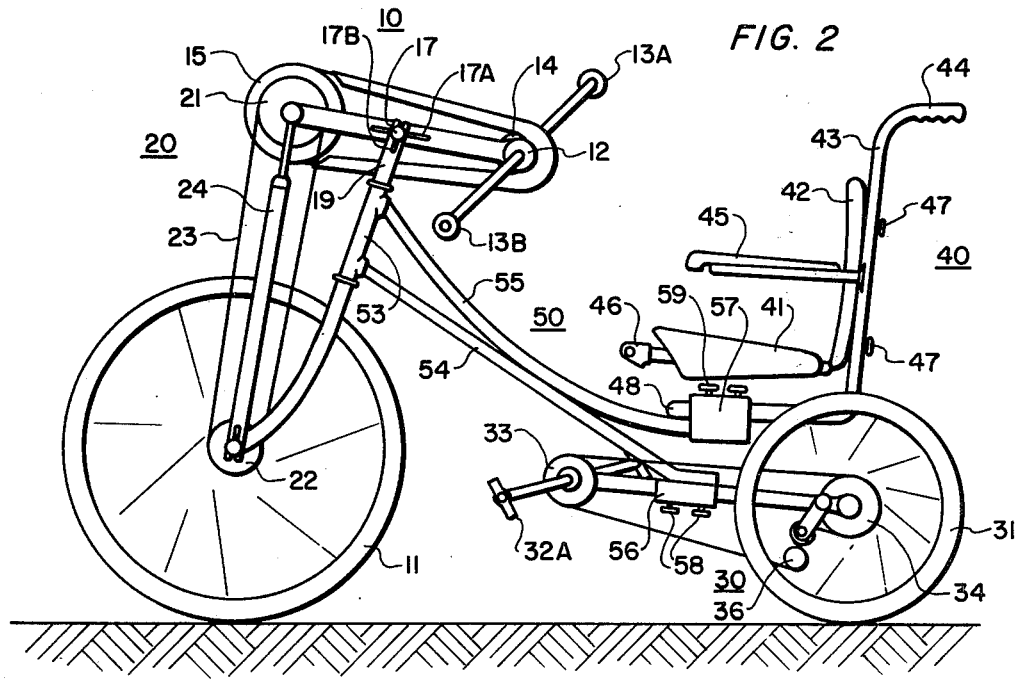
FIG. 2 shows a side view of another embodiment of this invention.

FIG. 2 shows another species of this invention, wherein most of the elements of FIG. 1 are seen and are similarly numbered. The upper and lower front wheel drive linkages or assemblies 10 and 20 and the rear wheel drive linkage or assembly 30 may be the same. The seat assembly 40 may be the same or it may include an arm rest or guard 45.

The frame assembly 50 in FIG. 2, however, has different frame members 54 and 55 that support and couple the housing or bushing 53 to the other elements of the tricycle. In FIG. 2 the frame member 54 terminates in a special bracket 56 which is slidably coupled to the rear wheel drive linkage support 37, and is secured in any desired position by the locking bolts 58. The frame member 55 terminates in another special bracket 57 which is slidably coupled to the lower end 48 of the back brace 43 to which the seat assembly 40 is securely attached. The seat assembly can be moved forward or backward and can be secured in any desired position by the locking bolts 59. The seat 41 and back rest 42 in FIG. 2 are seen to be mounted on the back brace 43 by vertical adjuster bolts 47 that permit vertical motion of the seat and backrest.

The seat 41 in both the figures may be tilted to any desired degree by conventional adjustments under the seat or saddle 41, not shown for simplicity.

In operation, the handicapped child or individual is seated comfortably in the seat assembly 40. In the preferred embodiment of FIG. 2, the height of the seat and seat assembly may be first adjusted to a comfortable height for getting in and out of the tricycle as well as for operating it. For safety sake, this will usually be relatively low to maintain a low center of gravity, to minimize the possibility of capsize, or of injury in the remote event of a fall. However, some vertical adjustment may be desirable to achieve the most effective position, and to accommodate different children and special physical conditions as well as to accommodate the growth of the child.

The slidable coupling 56 may then be adjusted to bring the pedals 32 into the most desirable position with respect to the legs and feet of the child for most effective use of, or for the prescribed exercise of the feet and legs. The slidable coupling must then be secured by the locking bolts 58 of the special bracket 56. The fastener 17 may then be released so that the upper front wheel drive linkage can be moved up or down, or forwards or backwards, until the handles 13 of the hand crank 12 are in the most comfortable and effective position with relation to the child. The fastener 17 is then secured and the child can operate the tricycle.

The seat assembly may be removeable, particularly in the species of FIG. 2, and may be replaced with any desired type of seat. The seat may be anything from a simple saddle, to the wheelchair type of seat and backrest, depending on the type and degree of the child's handicap. The optimum seat would appear to be an extra wide saddle that provides comfortable support without impeding the use of the legs. Arm rests or guards such as 45 may be an essential part of the seat, for safety sake, or may be omitted in special cases. In fact an actual wheel chair seat could be made detachable and provided with brackets to accommodate either the tricycle or the wheel chair.

This tricycle will, obviously, be geared to relatively low speeds. Speed changing gears of the deraileur type, as seen at 36, with suitable controls mounted on the frames can obviously be fit into any of the sprocket mechanisms or chain linkages. Planetary three-speed gears—preferably with a built-in back-cranking brake—should be mounted in the front wheel hub to be operated by the front wheel drive mechanism. This may be necessary to permit the child to manage certain gradients with this comparatively-heavy vehicle, or even to help him gradually develop the strength to use it.

Coaster gearing, as in conventional cycles, may also be desirable to make the tricycle more easy to push when the child tires or when it is empty. Brakes, not shown, of any standard type that can be adapted to this type of tricycle would, in any case, be provided.

Mechanisms of any standard type, not shown for simplicity, may be provided to directly engage or to permit coasting of either front or rear drive linkage, so that the tricycle can be driven by either hand or foot, or so that both must be used simultaneously for exercise or for therapeutic reasons. For example if the child's legs are virtually useless, the rear drive may be left to coast. In certain cases the pedals may be positioned side by side, in the same direction, to act as foot rests, and the rear wheel drive linkage left to coast. On the other hand, the pedals may be made to turn if it is considered that the legs should be made to exercise.

The front wheel drive mechanism has its lower drive linkage 20 pivotable about the front wheel axel, along with the sprocket 22 at its lower end. The upper front wheel drive linkage may be pivotable about the axis of its forward sprocket 15 and the upper sprocket 21 of the lower front wheel drive linkage. There must, of course, be some means for adjusting the lengths of the upper and lower front wheel drive linkage supports 18 and 24 respectively to provide the correct tension on their respective chains. Such an adjustment may also be necessary for the rear wheel drive linkage support 37.

The hand crank and foot pedal mechanisms may be of well known types, and may resemble each other except for the inevitable differences between hand-held and operated, and foot operated mechanisms. Straps or clamps of any well known type may be provided to hold the invalids feet on the pedals.

It is obvious that the sizes of the frame members 54 and 55 may be as large as necessary, or they may be doubled for additional strength. The special brackets 56 and 57 that slidably couple the rear-wheel drive and seat assemblies to the frame must be strong enough to bear the weights involved and provide a safe, rigid coupling. The special brackets may also be made as large or as long as necessary, and they may also be doubled, and additional locking bolts such as 58 and 59 may be provided. Rectangular pipe for the frame members 54 and 55 would provide additional rigidity.

It is to be understood that I do not desire to be limited to the exact details of construction shown and described since obvious modifications will occur to a person skilled in the art.

What is claimed is:

1. A tricycle for handicapped individuals having a steerable front wheel, and a pair of driveable rear wheels comprising a frame; a front wheel drive linkage operated by a hand crank; a rear wheel drive linkage operated by a foot pedal; and a seat assembly; means for coupling said front wheel drive linkage to said steerable front wheel; means for coupling said rear wheel drive linkage to said pair of drivable rear wheels; means for adjustably fastening said seat assembly to said frame; means for moving said front wheel drive linkage and said hand crank with respect to said frame and said seat assembly; means for securing said front wheel drive linkage and said hand crank in a given position whereby said tricycle can be driven by said hand crank and said foot pedals simultaneously, and steered by said front wheel drive linkage and said hand crank; means for moving said drivable rear wheels, and said rear wheel drive linkage, with respect to said frame and said seat assembly; and means for securing said drivable rear wheels and said rear wheel drive linkage in a given position wherein said rear wheels and said foot pedals are adjustable in a horizontal direction along the direction of said tricycle with respect to said frame.

2. A tricycle for handicapped individuals as in claim 1 wherein said front wheel drive linkage comprises an upper front wheel drive linkage, and a lower front wheel drive linkage; said upper front wheel drive linkage having a rear sprocket coupled to and rotated by said hand crank, a forward sprocket, an upper chain drivably connecting said forward and rear sprockets, and an upper front wheel drive linkage support rotatably mounting said forward and rear sprockets; said lower front wheel drive linkage having an upper sprocket concentric with and rigidly coupled to said forward sprocket of said upper front wheel drive linkage, a lower sprocket coupled to said front wheel, a lower chain connecting said upper and lower sprockets, and a lower front wheel drive linkage support rotatably mounting said upper and lower sprockets; and adjustable means for coupling the center portion of said front wheel drive linkage support to said steerable front wheel so that said hand crank can be adjusted with respect to said seat.

3. A tricycle for handicapped individuals as in claim 1 wherein said rear wheel drive linkage comprises a forward sprocket coupled to and rotatable by said foot pedals; a rear sprocket coupled to said rear wheels; a chain drivably connecting said forward and rear sprockets; a rear wheel drive linkage support rotatably mounting said forward and rear sprockets; and adjustable means for securing said rear wheel drive linkage support to said frame.

* * * * *